US010478875B2

(12) United States Patent
Houston

(10) Patent No.: US 10,478,875 B2
(45) Date of Patent: *Nov. 19, 2019

(54) SYSTEM AND METHOD FOR APPLYING COVERING MATERIAL WITH AN AEROSOLIZATION SYSTEM

(71) Applicant: Kelly K. Houston, Cornelius, NC (US)

(72) Inventor: Kelly K. Houston, Cornelius, NC (US)

(73) Assignee: Aerosolization Equity Investments, LLC, Cornelius, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,163

(22) Filed: Oct. 21, 2014

(65) Prior Publication Data
US 2015/0117955 A1   Apr. 30, 2015

Related U.S. Application Data

(60) Provisional application No. 61/895,142, filed on Oct. 24, 2013.

(51) Int. Cl.
*B05B 7/00* (2006.01)
*B05B 7/32* (2006.01)
(Continued)

(52) U.S. Cl.
CPC .............. *B09B 1/004* (2013.01); *B05B 1/207* (2013.01); *B05B 7/0075* (2013.01);
(Continued)

(58) Field of Classification Search
CPC .......... B05B 1/207; B05B 13/005; B05B 7/30
See application file for complete search history.

(56) References Cited

U.S. PATENT DOCUMENTS 2,684,949 A * 7/1954 McMillan ........... B01F 17/0021
106/271
3,979,061 A * 9/1976 Kircher ..................... F25C 3/04
239/14.2
(Continued)

FOREIGN PATENT DOCUMENTS

EP          2223593 A1 *  9/2010  .......... A01M 7/0014
WO     WO 0177027 A1 * 10/2001  ............. B01D 3/065

OTHER PUBLICATIONS

Sandy et al., Reviews of Available Technologies for the Removal of Selenium from Water; Jun. 2010.*

*Primary Examiner* — Benjamin F Fiorello
(74) *Attorney, Agent, or Firm* — Coats & Bennett, PLLC

(57) ABSTRACT

A method for effective and efficient water or wastewater aerosolization and industry specific and regulatory agency approved ADC, soil stabilization or penetrating solution dissemination over identified and specific areas that are to be addressed. The water or wastewater and industry or regulatory body specifically approved ADC, soil stabilization or penetrating reagent solution(s) is directed to an "Integrated Mobile Aerosolization System (IMAS)" or other system having a turbine and being integrated and mobile. The turbine is driven so as to generate a system of air. Integrated pumps are utilized to move the water or wastewater and industry or regulatory body specific and ADC, soil stabilization or penetrating reagent solution(s) to a series of nozzles that aerosolizes the water or wastewater and ADC, soil stabilization or penetrating reagent solution into the path of the system of air. The water or wastewater and ADC, soil stabilization or penetrating reagent solution form a mixture that is entrained in the system of air. The mixture of water or wastewater and ADC, soil stabilizing or penetrating reagent solution is directed over a specific area that is to be covered with an approved material. The water or wastewater (Continued)

and ADC, soil stabilization or penetrating reagent solution form that industry specific and regulatory body approved covering material that is applied to the specific area.

7 Claims, 3 Drawing Sheets

(51) Int. Cl.
| | |
|---|---|
| B09B 1/00 | (2006.01) |
| C09K 17/00 | (2006.01) |
| B05B 7/30 | (2006.01) |
| B09C 1/00 | (2006.01) |
| B09C 1/08 | (2006.01) |
| B05D 1/02 | (2006.01) |
| B05B 1/20 | (2006.01) |
| B05B 13/00 | (2006.01) |

(52) U.S. Cl.
CPC .............. *B05B 7/0081* (2013.01); *B05B 7/30* (2013.01); *B05B 7/32* (2013.01); *B05B 13/005* (2013.01); *B05D 1/02* (2013.01); *B09C 1/00* (2013.01); *B09C 1/08* (2013.01); *C09K 17/00* (2013.01); *B09B 2220/00* (2013.01); *B09C 2101/00* (2013.01); *Y02W 30/32* (2015.05)

(56) References Cited

U.S. PATENT DOCUMENTS

| | | | | |
|---|---|---|---|---|
| 4,397,422 A | * | 8/1983 | Gwyn | B05B 7/30 222/136 |
| 4,519,338 A | * | 5/1985 | Kramer | B09B 1/004 118/305 |
| 4,597,524 A | * | 7/1986 | Albertsson | F25C 3/04 239/14.2 |
| 4,919,331 A | * | 4/1990 | Kosik, Sr. | F25C 3/04 239/132.1 |
| 5,082,500 A | * | 1/1992 | Nachtman | B01F 5/106 106/162.5 |
| 5,167,367 A | * | 12/1992 | Vanderkelen | F04D 27/004 239/14.2 |
| 5,169,783 A | * | 12/1992 | Kieft | A01G 15/00 239/2.2 |
| 5,400,966 A | * | 3/1995 | Weaver | F25C 3/04 239/14.2 |
| 5,564,628 A | * | 10/1996 | Hall | B05B 5/03 239/3 |
| 5,836,513 A | * | 11/1998 | Smith | F25C 3/04 239/14.2 |
| 6,378,778 B1 | * | 4/2002 | Lurås | F25C 3/04 239/14.2 |
| 6,558,079 B1 | * | 5/2003 | Kozak | B09B 1/004 405/129.15 |
| 6,742,718 B2 | * | 6/2004 | Doebler | A01M 7/0003 239/147 |
| 8,657,941 B2 | * | 2/2014 | Hutchinson | B01D 47/06 239/172 |
| 8,926,792 B1 | * | 1/2015 | Houston | C02F 1/00 159/4.01 |
| 2005/0084334 A1 | * | 4/2005 | Shi | B09B 1/004 405/129.9 |
| 2005/0191132 A1 | * | 9/2005 | Terrel | B09B 1/004 405/129.45 |
| 2005/0220542 A1 | * | 10/2005 | Marsh | B09B 1/004 405/129.9 |
| 2007/0186778 A1 | * | 8/2007 | Peterson | B01D 47/06 96/281 |
| 2012/0085836 A1 | * | 4/2012 | Tiu | A01M 7/0014 239/77 |
| 2012/0097763 A1 | * | 4/2012 | Orubor | B05B 7/30 239/303 |

* cited by examiner

SYSTEM AND METHOD FOR APPLYING COVERING MATERIAL WITH AN AEROSOLIZATION SYSTEM

This application claims priority under 35 U.S.C. § 119(e) from the following U.S. provisional application: Application Ser. No. 61/895,142 filed on Oct. 24, 2013. That application is incorporated in its entirety by reference herein.

FIELD OF THE INVENTION

The present invention relates to systems and processes for applying a covering or penetrating material and more particularly to a system and process for applying a covering or penetrating material to waste such as coal ash, mined products and various forms of contamination.

BACKGROUND OF THE INVENTION

Alternative Daily Cover or "ADC" is a federal, state or local regulatory agency allowed product and process that is used in many industrial and environmentally sensitive applications. Examples include but are not limited to landfills, coal ash, industrial wastes, mines, animal wastes, etc. When a product or by-product, soil disturbance or waste is produced it has been determined by levels of government and separate industries that it is either desired or environmentally necessary to cover products, by-products, soils or wastes produced or deposited. These products, by-products or waste streams are usually disturbed or contaminated in some way and typically include dissolved organic matter, inorganic matter, heavy metals and a host of other known and unknown contaminants. These contamination or disturbed soils sources are collected on site and covered, sometimes at the end of daily operations. These agencies and industries have declared waterborne or airborne dissipation of these products, by-products, soils or wastes to be a threat to local rivers, streams and soils, as well as municipal water supplies and ground water located in the general vicinity of industries, waste facilities or waste generating sites. The traditional way of covering these products, by products, soils or waste has been with a prescribed amount of dirt or other approved natural or man-made solutions or mixtures. These solutions or mixtures are both laborious and expensive yet less laborious and expensive than past approved practices.

Traditional dirt covering and past approved methods and applications of approved ADC solutions, soil disturbance or other additive reagent, for example, are both expensive and inefficient. Typically past regulator or industry approved processes and their related equipment require considerable labor and very specialized and sole purpose equipment at least at the end of daily operations. It is the labor, specialized and sole use of the equipment and the sole source of approved ADC, soil disturbance, or other additive reagent solutions or materials that makes the past methods or processes extremely expensive. For example, it is not unusual for a typical size product, by-product or waste processing facility to spend more than $1 million a year in dealing with regulator or industry specific additive reagent requirements.

SUMMARY OF THE INVENTION

The present invention relates to a method or process of applying covering material to a selected area such as an area that might include contaminants, waste material, mining products or by-products and coal ash. The method includes generating a system of air with a turbine and directing the system of air through a turbine housing. Further, the method includes directing water or a wastewater from a water source through a series of nozzles disposed adjacent the turbine housing. A covering or penetrating composition is mixed with the water or wastewater upstream of the nozzles to form an approved covering or penetrating material reagent. The system and method includes directing the covering or penetrating material from the nozzles. After directing the covering or penetrating material from the nozzles, entraining the covering or penetrating reagent material in the system of air passing through the turbine housing. Thereafter, the system and method includes shooting the air, covering or penetrating reagent material from the turbine housing and causing the covering or penetrating reagent material to be airborne. The system and method includes directing the airborne covering or penetrating reagent material from the turbine housing to the selected area and directing the airborne covering or penetrating reagent material onto the selected area where the covering or penetrating reagent material covers at least a portion of the selected area.

The present invention in one embodiment relates to a process for onsite application and aerosolization of an industry and regulatory agency approved ADC, soil stabilization or other type reagent solution using an integrated mobile aerosolization system (IMAS). In this embodiment of the present invention, waste or regular water is directed to a mobile, self-contained, high output air-water/wastewater machine that includes an adjustable turbine and a set of adjustable and interchangeable nozzles. The turbine is either diesel or natural gas motor or electric generator driven and is directly integrated with the IMAS, creating a system of air and waste or regular waters which flows in front of the wind stream created by the turbine. The motor, turbine and an integrated pump are all combined to create a unified, complete and mobile waste or regular water system that is capable of disseminating, the approved ADC, soil stabilization or other reagent solution over the product, by-product or waste at least at the end of daily operations, for example. Waste or regular waters are pumped under pressure past the nozzles and the nozzles spray the waste or regular water into the path of the turbine system's air-flow. This forms a mobile and controllable mixture of air-waste or regular water that can then carry the approved ADC, soil stabilization or other reagent solution for maximum dissemination across the daily selected and approved operational area. The IMAS propels the mixture of approved ADC solution, soil stabilization or other reagent and air-waste or regular water over the identified and selected contaminated area to a prescribed thickness or permeability threshold. Much of the water or wastewater in the mixture in this embodiment is aerosolized which increases the throw-distance and coverage thoroughness of the ADC solution while reducing run off. Using an IMAS to disseminate an ADC, soil stabilization or other approved reagent solution is fast, easy, thorough and less expensive than either traditional dirt or past ADC, soil stabilization or other approved reagent dissemination methods or processes.

In another particular embodiment, leachate or other waste or regular water is pumped under pressure into the IMAS and finally through the nozzles for dissemination and onsite disposal several times per day. The nozzles emit an aerosol that is mixed and accelerated with the IMAS's airflow which forms a covering or penetrating reagent material which contains both an ADC solution as well as odor controlling or contamination reducing solutions. The IMAS is mobile and thus easily and quickly positioned and directed to propel the mixture of covering material over the approved, selected and necessary coverage area.

Other objects and advantages of the present invention will become apparent and obvious from a study of the following description and the accompanying drawings which are merely illustrative of such invention.

DESCRIPTION OF EXEMPLARY EMBODIMENTS

Figure 1:
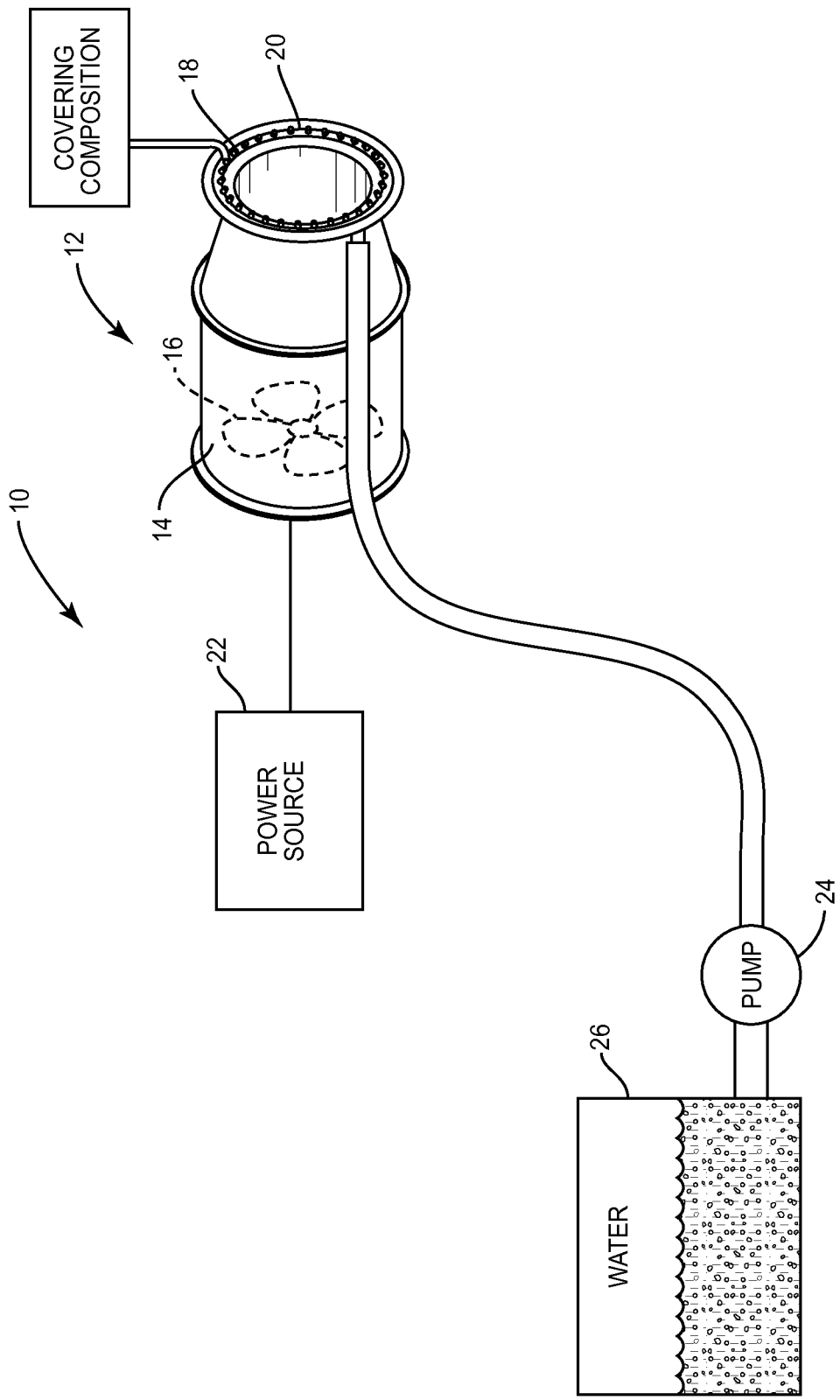
FIG. 1 illustrates a system for applying the covering material to a selected area.

With further reference to the drawings, FIG. 1 shows a system for generating a covering or penetrating reagent material and directing the covering or penetrating reagent material to a selected area where the covering or penetrating reagent material is applied. In FIG. 1, there is shown an IMAS that is indicated generally by the numeral 10. As is discussed herein, the IMAS 10 is used to direct water or wastewater from a water source and to mix the water with a covering or penetrating composition such as an ADC or soil stabilization or other approved reagent solution. The IMAS shown in the drawings is indicated generally by the numeral 12. IMAS 12 includes a turbine housing 14 that includes an inlet end and an outlet end and is configured to channel or direct a system of air through the same. A turbine 16 is mounted in the inlet end portion of the turbine housing 14 and can be rotatively mounted on a shaft and forms a part of the IMAS 12. As will be appreciated from subsequent portions of the disclosure, the turbine 16 is driven such that it generates a system of air that moves from the inlet of the turbine housing, through the turbine housing and out the outlet end. IMAS 12 also includes a ring pipe 18 disposed about the outlet end of the turbine housing 14. Circumferentially spaced around the ring pipe 18 is a series of nozzles 20. Nozzles 20 are communicatively connected to the ring pipe 18 such that water or compositions directed into the ring pipe are expelled or exhausted via the nozzles 20. It should be pointed out that in a preferred embodiment the nozzles 20 are adjustable and replaceable.

To provide power to the application system 12 and particularly to drive the turbines 16, there is provided an integrated power source 20. Various types and forms of power sources can be utilized. In one embodiment, the power source is a diesel, natural gas or gasoline internal combustion engine that is operatively connected to a drive shaft that drives the turbine 16. In another embodiment, the power source can comprise an electric motor operatively connected to the drive shaft of the turbine 16 and wherein the electric motor is powered by an integrated and conventional generator.

Also forming a part of the system 10 or the IMAS 12 is one or more integrated pumps. The function of the one or more pumps is to pump the water under pressure into the ring pipe 18 and out the respective nozzles 20. In addition, when employing IMAS 12, in some embodiments, a mobile tank or storage vessel is provided on board the IMAS for holding the water that is utilized in the process described herein. As will be described, the apparatus may include tanks for carrying various covering or penetrating compositions. In addition, the covering or penetrating compositions can be carried in a mobile tank or trailer that is pulled by the IMAS 12.

The IMAS or system for applying the covering material can be designed to throw the covering or penetrating material a substantial distance. Further, the system can be mounted on a mobile platform such that it can be moved from point-to-point. In the case of an IMAS embodiment, the turbine housing is typically adjustably mounted on the platform such that it can rotate around the platform and also can be rotated up and down such that the turbine housing can effectively direct a stream of airborne covering or penetrating material a substantial distance from the outlet end of the turbine housing 14. Thus, with the numerous adjustment features associated with the turbine housing 14, the turbine housing can be aimed and directed in an infinite number of directions.

The pressure applied to the water directed into the ring pipe 18 can vary. In one example, the pressure is maintained between 30 psi and 200 psi. Further, the nozzles 20 can be selected by a person of ordinary skill in the art to provide a degree of aerosolization, throw distance and covering specifications necessary or appropriate to optimize the efficiency of the overall process.

The range for the apparatus or IMAS 12 can vary. It can vary based on active controls or it might vary based on environmental conditions. In one example, the speed of the turbine can be varied so as to adjust the velocity of the air and the energy imparted to the air. That will effectively control or adjust the throw of the covering material from the outlet end of the turbine housing 14. In addition, the flow rate and pressure of the water and the covering or penetrating composition being directed into the ring pipe 18 can be varied also. This will vary the degree of aerosolization, throw distance and speed of approved and specified coverage. It is postulated that this will vary the overall efficiency of the covering or penetrating process. As a general rule, the higher the pressure for a given nozzle, the greater the aerosolization, throw distance and speed of approved and specified coverage.

The system shown in FIG. 1 is designed to direct water or any wastewater from a water source 26 via pump 24 into the ring pipe 18. Thus it is appreciated that the water or wastewater being directed into ring pipe 18 is under pressure. The system and process disclosed herein entails mixing a covering or penetrating reagent composition with the water or wastewater before the water or wastewater is emitted from the nozzles 20. Various approaches can be taken to achieve this. Note in FIG. 1 where there is a covering or penetrating reagent composition 21 that is fed into the ring pipe 18. Various approaches can be taken for directing the covering or penetrating reagent composition into the ring pipe. One example, a pump can be used to pump the covering or penetrating reagent composition from a source into the ring pipe 18. In the case of the embodiment shown in FIG. 1, the covering or penetrating reagent composition is directed into the ring pipe 18 where it mixes with the water or wastewater from the water or wastewater source 26. This forms a water/wastewater-covering or penetrating reagent composition mixture in the ring pipe 18. This mixture is expelled under pressure from the ring pipe 18 via the nozzles 20. The water/wastewater-covering or penetrating reagent composition mixture (sometimes referred to as a covering or stabilizing or penetrating material) is directed inwardly from the ring pipe 18 into the path of the system of air generated by the turbine 16. In one embodiment, the water/wastewater-covering or penetrating or stabilizing reagent composition mixture is aerosolized and this aerosolized mixture is entrained in the system of air and after which it is expelled from the turbine housing 14.

The covering compositions used can vary. For example, there are known covering composition materials that are known by the trade names of "ConCover", "TopCoat" and "Posishell". There are other aqueous solutions that can be employed as covering materials or as a constituent of covering material. In some cases, a covering material is a blend of polymers and recycled fiber such as newspaper. In some cases, the covering composition can comprise a cement mortar coating reinforced with structural composite fibers. These are examples of covering compositions. Examples of covering compositions that can be applied according to the methods or processes described herein are: alternative daily cover additives, soil stabilizing or hardening additives, odor control additives, antimicrobial additives, and other covering, stabilizing or penetrating reagent material compositions that can be utilized to form a cover or stabilizer that can be applied over a waste area or another area that requires or which can benefit from such a covering material.

Figure 2:
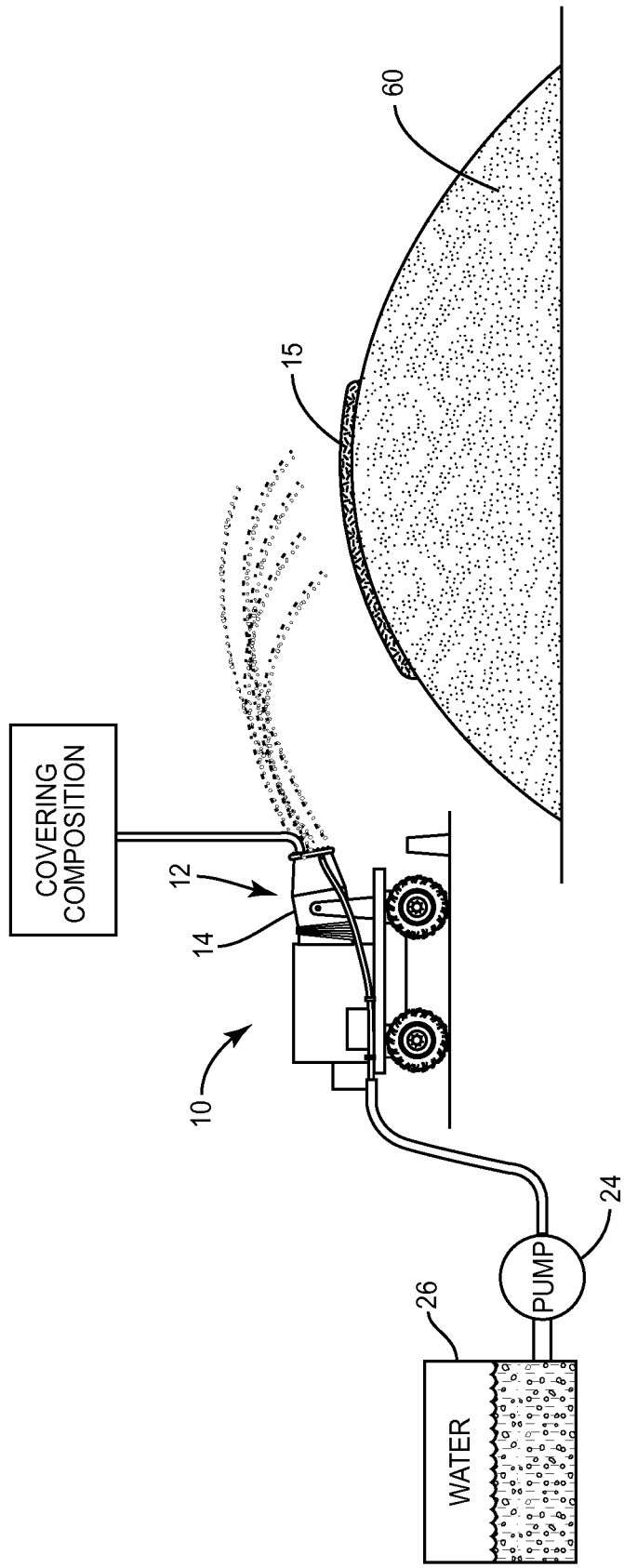
FIG. 2 is a schematic illustration showing a system and process for applying the covering material to a selected area.

Turning to FIG. 2, there is illustrated therein a process for applying a covering, penetrating or stabilizing material to a selected area 60. The selected area where the covering, stabilizing or penetrating reagent material is to be applied could be an area of coal ash, a contaminated area, an area including waste, an area including mining products or by-products of mining, a landfill or any other area where there is a need to apply a covering, stabilizing or penetrating reagent material. For example, a covering, stabilizing or penetrating reagent material can be applied to control blowing litter, reduce vector and animal intrusion, prevent surface water ponding and infiltration, control gas movement, prevent erosion of surface and side slopes, reduce wind erosion, chemically minimize dust generation and movement, minimize esthetic problems such as odor, prevent fire hazards, or provide a more solid surface for vehicular traffic. This is not an exhaustive list of applications but exemplifies and shows the types of areas that might benefit from a covering, stabilizing or penetrating reagent material. In any event, with reference to FIG. 2, water or wastewater is pumped from a water or wastewater source 26 via a pump 24 to the system or apparatus utilized to apply the covering, stabilizing or penetrating reagent material. The water or wastewater used can be of various types. It can be city water, well water, or wastewaters of all types. As shown in FIG. 2 and as explained earlier, a covering, stabilizing or penetrating reagent composition is directed into the ring pipe 18 which mixes with the water or wastewater to form the water or wastewater-covering, stabilizing or penetrating reagent composition mixture. This mixture is directed out the nozzles 20 into the interior area of the ring pipe 18. The turbine generates a system of air that is directed through and past the ring pipe 18, causing the water or wastewater-covering, stabilizing or penetrating reagent composition mixture to be entrained with the system of air. The system then shoots the material out of the outlet end of the turbine housing 14 and aims the material to the specified and approved area that is to receive the material. It is appreciated that the system or apparatus 10 employed for applying the covering material can be moved around and on the area to be covered such that a uniform layer or film 15 of material is appropriately applied.

Figure 3:
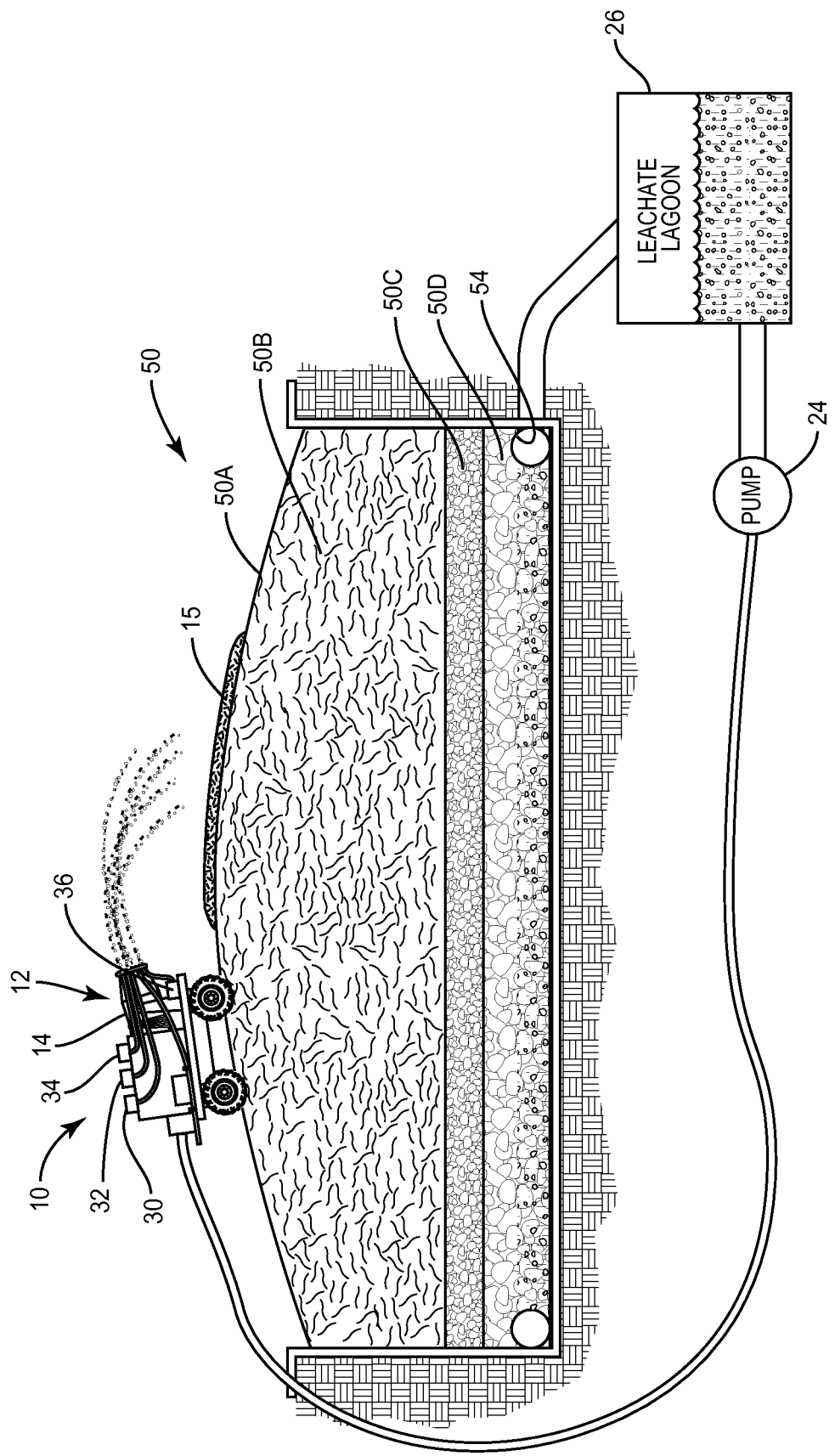
FIG. 3 is a schematic illustration showing the system and process of the present invention applying a covering material to a landfill.

Turning to FIG. 3, the system or IMAS used to apply the cover, stabilizer or penetrator reagent material is shown equipped with any number of totes. In this example, there is an odor control tote 30 that is mounted on the IMAS 12, as well as an ADC tote 32, and also an antimicrobial tote 34 and finally a general aqueous solution tote 36 that can comprise various covering, stabilizing or penetrating reagent compositions.

All of these totes are operative such that individually or various ones thereof can be utilized to supply a covering, stabilizing, or penetrating reagent composition to the ring pipe 18. In some embodiments, only one tote will be used, such as the ADC tote 32. In this case, an ADC composition is pumped from the tote into the ring pipe 18. In other applications, compositions from two or more of the totes can be mixed and the resulting mixture can be mixed with the water or wastewater in the ring pipe to form the covering, stabilizing or penetrating reagent material.

In FIG. 3, there is shown a landfill site 50 that includes an upper surface 50A. Disposed below the upper surface 50A is a depth of soil, trash, liner, filtering system, etc. that is referred to by 50B in the drawings. This material can be continually mixed and turned during the course of the operation of the landfill. Although the particular structure of a landfill can vary from location to location, in one embodiment there is provided a layer of gravel or sand 50C beneath the upper soil and trash layer. Below the layer of gravel 50C is a layer of rock 50D and below the layer of rock is usually clay and a retaining liner or other catch membranes. The liner must stretch across the entire dimensions of the landfill and is basically utilized to retain and prevent leachate or other wastewaters from moving further downwardly into the underlying soil. A network of drain pipes 54 is typically employed just above the liner and is used to collect the leachate and to channel the leachate to a holding tank or pond, which in this case is also referred to by the numeral 26. Once in the holding area, the leachate or other wastewater can be used in various ways. In this example, leachate or other wastewater is pumped from the holding tank or lagoon 26 via pump 24 to the apparatus or IMAS 12. The leachate or other wastewater is then mixed with the covering, stabilizing or penetrating reagent composition in the same manner as discussed above. Together, the leachate or other wastewater and the composition are mixed together and then in turn entrained in the system of air generated by the turbine 16 which yields the material that is applied to the top surface of the landfill 50A. This particular process can be carried out on a daily basis or other periodic basis. The covering, stabilizing or penetrating reagent composition which is mixed with the water/leachate or other wastewater ultimately forms the covering, stabilizing or penetrating reagent material that is expelled from the IMAS or other apparatus for applying the material to an approved and specified area. Note that when a mobile system is used that the mobile system can move around on the landfill or other site so as to apply a uniform cover 15 to the upper surface 50A of the site.

From the foregoing specification and discussion, it is seen that the process or method of the present invention is an efficient and effective way of disseminating covering, stabilizing or penetrating reagent material such as an ADC or soil stabilizing covering material. In addition, other advantages can be achieved, especially when the water that is utilized in the process is a wastewater because the system effectively disseminates and disposes of wastewater (through aerosolization for example) in the process of providing a covering, stabilizing or penetrating reagent material to the selected and approved area of interest. This process is effective and efficient because a substantial portion of the wastewater is aerosolized into the atmosphere while the covering, stabilizing or penetrating reagent material is applied to the approved area of interest.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of aerosolizing an alternative daily covering composition and applying said alternative daily covering composition to a selected land area comprising:
    generating a system of air with a turbine;
    directing the system of air through a turbine housing;
    directing water or wastewater from a water or wastewater source;
    mixing the alternative daily covering composition with the water or wastewater upstream of a plurality of nozzles to form a mixture comprising water or wastewater and the alternative daily covering composition;
    directing the mixture of the water or wastewater and alternative daily composition from the nozzles;
    after directing the mixture from the nozzles, aerosolizing the mixture of water or wastewater and alternative daily covering composition by entraining the mixture in the system of air passing through the turbine housing;
    shooting the aerosolized water or wastewater and alternative daily covering composition mixture entrained in the system of air out an outlet end of the turbine housing and causing the water or wastewater and alternative daily covering composition mixture to be airborne; and
    directing the aerosolized and airborne water or wastewater and alternative daily covering composition over the selected land area and causing the alternative daily covering composition to fall out of the mixture and to be applied to the selected land area.

2. The method of claim 1 wherein the series of nozzles are communicatively connected to a ring pipe disposed adjacent the turbine housing and the method includes directing the water or wastewater into the ring pipe and directing the alternative daily covering composition into the ring pipe where the composition is mixed with the water or wastewater in the ring pipe prior to being emitted from the nozzles.

3. The method of claim 1 wherein the method includes mixing an antimicrobial composition or an odor control composition with said alternative daily covering composition.

4. A method of disseminating and disposing of wastewater and at the same time applying an alternative daily covering composition to a selected land area, the method comprising:
    generating a system of air within a turbine;
    directing the system of air through a turbine housing including an inlet and an outlet;
    directing the wastewater from a wastewater source;
    mixing the wastewater with the alternative daily covering composition to form a wastewater-alternative daily covering composition mixture;
    pumping the wastewater-alternative daily covering composition mixture to and through a series of nozzles and aerosolizing the wastewater-alternative daily covering composition mixture by entraining the wastewater-alternative daily covering mixture in the system of air passing through the turbine housing to form an aerosolized wastewater-alternative daily covering composition-air mixture;
    shooting the aerosolized wastewater-alternative daily covering composition air mixture out an outlet end of the turbine housing causing the wastewater-alternative daily covering composition air mixture to become airborne;
    directing the airborne aerosolized wastewater-alternative daily composition air mixture over the selected land area;
    causing the alternative daily covering composition to fall out of the wastewater-alternative daily covering composition-air mixture onto the selected land area where the alternative daily covering composition is applied to the selected land area; and
    aerosolizing into the atmosphere a portion of the wastewater in the wastewater-alternative daily covering composition air mixture.

5. The method of claim 4 wherein the series of nozzles are communicatively connected to a ring pipe disposed adjacent the turbine housing, and the method includes directing the wastewater into the ring pipe and also directing the alternative daily covering composition into the ring pipe where the alternative daily covering composition and the wastewater are mixed in the ring pipe.

6. The method of claim 4 wherein the wastewater comprises leachate and said method further comprising:
    collecting the leachate at a landfill in a collection structure;
    pumping the leachate from the collection structure and mixing the leachate with the alternative daily covering composition to form a leachate-alternative daily covering composition mixture; and
    entraining the leachate-alternative daily covering composition mixture in the system of air and shooting the system of air and leachate-alternative daily covering composition mixture through the air and over said landfill and causing said alternative daily covering composition to fall out onto said landfill.

7. A method of utilizing leachate at a landfill comprising:
    generating a system of air within a turbine;
    directing the system of air through a turbine housing including an inlet and an outlet;
    collecting leachate produced by said landfill in a leachate collection structure;
    pumping the leachate from the leachate collection structure;
    mixing the leachate with an alternative daily covering composition to form a leachate-alternative daily covering composition mixture;
    pumping the leachate-alternative daily covering composition mixture to and through a series of nozzles and aerosolizing the leachate-alternative daily covering composition mixture by entraining the leachate-alternative daily covering composition mixture in the system of air passing through the turbine housing to form an aerosolized leachate-alternative daily covering composition air mixture;
    shooting the aerosolized leachate-alternative daily covering composition air mixture out an outlet end of the turbine housing, causing the leachate-alternative daily covering composition air mixture to become airborne;
    directing the airborne aerosolized leachate-alternative daily covering composition air mixture over said landfill; and causing the alternative daily covering composition to fall out of the leachate-alternative daily covering composition-air mixture onto said landfill and form an alternative daily covering layer over said landfill.

\* \* \* \* \*